R. D. MacLAURIN.
METHOD OF SINGEING HOGS.
APPLICATION FILED OCT. 1, 1921.
1,422,217.
Patented July 11, 1922.
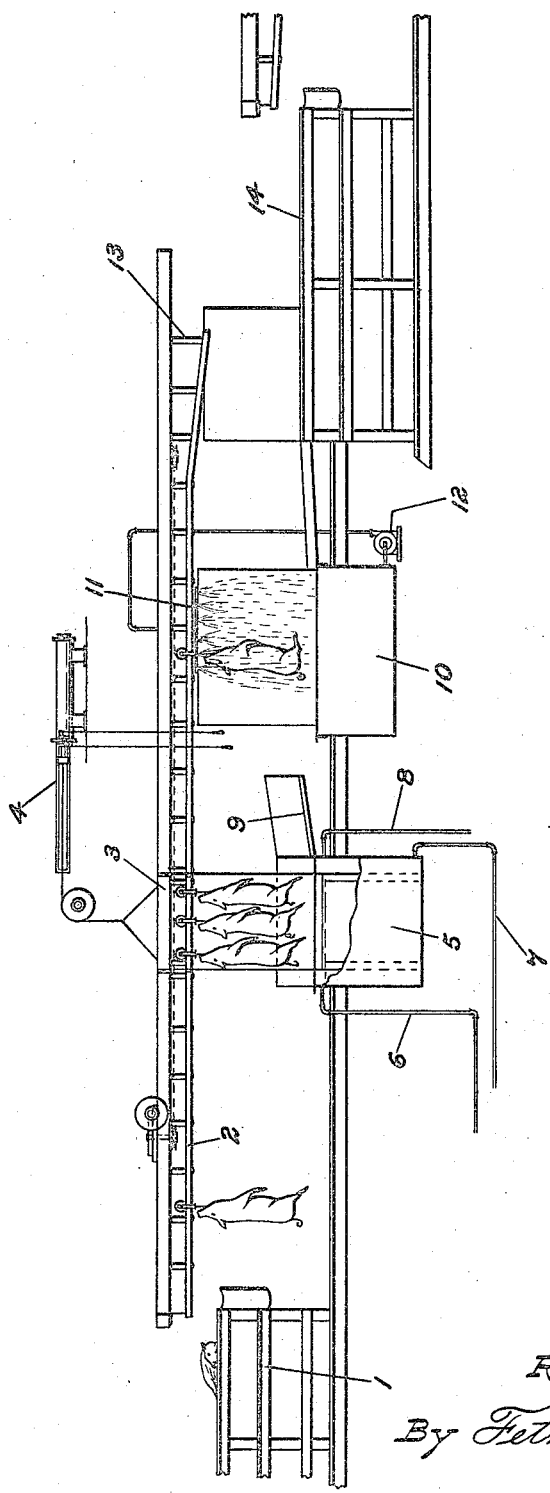
Inventor,
R. D. MacLaurin.
By Fetherstonhaugh & Co
Attys.

UNITED STATES PATENT OFFICE.

ROBERT DAWSON MacLAURIN, OF TORONTO, ONTARIO, CANADA.

METHOD OF SINGEING HOGS.

1,422,217.   Specification of Letters Patent.   Patented July 11, 1922.

Application filed October 1, 1921. Serial No. 504,688.

*To all whom it may concern:*

Be it known that I, ROBERT DAWSON MACLAURIN, a resident of the city of Toronto, in the county of York, in the Province of Ontario, Canada, have invented certain new and useful Improvements in Methods of Singeing Hogs, of which the following is the specification.

My invention relates to improvements in methods of singeing hogs and the object of the invention is to devise a method which will make the skin tender for cutting and impart the desirable amber colour required by the trade without the disadvantages that occur in the ordinary singeing process wherein the hog is subjected to the direct contact of the flames from oil or gas burners.

Hitherto the usual method of singeing hogs in packing houses has been to place them in a singeing chamber wherein they are subjected to the direct action of the flames from oil or gas burners. In this method the temperature is exceedingly difficult to regulate and the direct contact of the flames with the skin of the hog carbonizes or blackens the same. Too high a temperature splits the skin and breaks down the fat and protein. In addition there is a loss of weight due to having to scrape off the blackened epidermis.

I will now describe the apparatus by means of which my method is carried out, such apparatus being illustrated in side elevation in the figure shown in the drawing.

The hogs from the beater are placed on the cleaning bench 1 and from thence are suspended from a rail conveyor 2 so that they can be slid along the same onto the dipping hoist 3 operated by an air cylinder 4 or other similar means.

5 is a dipping tank containing the liquid in which the hogs are to be dipped, said liquid being introduced into the tank 5 in the heated state through the pipe 6, and discharged from the tank through the pipe 7. 8 is an overflow pipe. 9 is a guard and driptray. 10 is a hot water tank. 11 is a spray situated above the same through which water is pumped from the pump 12. 13 is the drop-off end of the rail conveyor and 14 is the gambrel bench.

The liquid I have found most suitable for singeing hogs is a very hard paraffine having a flash point of approximately 195° C. with a melting point of approximately 45° C.

Such liquid which is introduced into the tank 5 is heated to a temperature in the neighbourhood of 170° C., and the hogs are dipped thereinto for a period of about 10 seconds.

The effect of such dipping dehydrates the skin of the hog, bringing about the contraction of the same and makes the skin tender for cutting and imparts the desirable amber colour required by the trade.

After the hog has been dipped the dipping hoist is rehoisted, the hog is carried along above the hot water tank 10 where it is sprayed by means of the spray 11, with water sufficiently hot to melt off the paraffine.

It then passes off the drop-off end of the rail conveyor and is deposited on the gambrel bench.

Although I have stated that I find hard paraffine melted into liquid state and heated to a suitable temperature the most desirable substance for effecting the singeing of the hog, it is to be understood that any substance capable of condensing and polymerizing the gelatinous proteins with the consequent diminution of the water in the skin could be used and I do not wish to confine myself to the use of hard paraffine.

Further although I have described a specific apparatus for carrying out my method it is to be understood that many other devices could be used for the purpose without affecting the efficiency of my method.

If desired the hog instead of being sprayed can be dipped into the hot water tank.

From the above description it will be seen that I have devised a simple and effective method for singeing hogs which achieving all the results aimed at by the methods at present in use will be free of the disadvantages of such methods.

Further in my method owing to there being no carbonization of the skin of the hog there will be no loss in weight and in addition in my method it is possible to regulate the temperature of the liquid paraffine to the exact temperature required.

What I claim as my invention is.

1. A method of singeing hogs which consists in dipping the hog into heated liquid capable of causing the gelatinous proteins to condense and polymerize with the consequent diminution of the water in the skin.

2. A method of singeing hogs which consists in dipping the hogs into wax melted into the liquid state and heated to the temperature required for singeing.

3. A method of singeing hogs which consists in dipping the hogs into paraffine melted into the liquid state and heated to the temperature required for singeing.

4. A method of singeing hogs which consists in dipping the hogs into hard paraffine melted into the liquid state and heated to a temperature of approximately 170° C.

5. A method of singeing hogs which consists in dipping the hogs into wax melted into the liquid state and heated to the temperature required for singeing and means for removing the wax from the skin of the hog after dipping.

6. A method of singeing hogs which consists in dipping the hogs into paraffine melted into the liquid state and heated to the temperature required for singeing and means for removing the paraffine from the skin of the hog after dipping.

7. A method of singeing hogs which consists in dipping the hogs into hard paraffine melted into the liquid state and heated to a temperature of approximately 170° C., then spraying or washing the skin of the hog with hot water to remove the paraffine.

ROBERT DAWSON MacLAURIN.